(12) United States Patent
Bond et al.

(10) Patent No.: US 9,995,425 B2
(45) Date of Patent: Jun. 12, 2018

(54) REMOVABLE AND REUSABLE INSULATION WRAP FOR PIPE, HOSES, AND FIXTURES

(71) Applicants: Justin Mecklenburg, Kingfisher, OK (US); Justin Mark Snodgrass, Kingfisher, OK (US); Melissa Henry, Oklahoma City, OK (US)

(72) Inventors: Christian Bond, Edmond, OK (US); Dustin Henry, Edmond, OK (US); Melissa Henry, Oklahoma City, OK (US)

( * ) Notice: Subject to any disclaimer, the term of this patent is extended or adjusted under 35 U.S.C. 154(b) by 816 days.

(21) Appl. No.: 14/204,667

(22) Filed: Mar. 11, 2014

(65) Prior Publication Data
US 2015/0260329 A1    Sep. 17, 2015

(51) Int. Cl.
*F16L 59/02* (2006.01)
*B32B 3/06* (2006.01)
(Continued)

(52) U.S. Cl.
CPC .............. *F16L 59/029* (2013.01); *B32B 3/06* (2013.01); *B32B 5/245* (2013.01); *B32B 25/10* (2013.01); *B32B 25/18* (2013.01); *B32B 27/065* (2013.01); *B32B 27/12* (2013.01); *F16L 57/06* (2013.01); *F16L 59/026* (2013.01); *F16L 59/028* (2013.01); *F16L 59/08* (2013.01); *F16L 59/145* (2013.01); *F16L 59/168* (2013.01); *B32B 2262/0269* (2013.01);
(Continued)

(58) Field of Classification Search
CPC ....... F16L 59/029; F16L 59/028; F16L 59/08; F16L 57/06; F16L 59/026; F16L 59/145; F16L 59/168; B32B 3/06; B32B 2262/101; B32B 2307/304; B32B 2307/416; B32B 2597/00; B32B 5/245; B32B 25/10; B32B 25/18; B32B 27/065; B32B 27/12; B32B 2262/0269; B32B 2262/062; B32B 2266/06; B32B 2266/08; B32B 2307/51; Y10T 428/1334; Y10T 428/23; Y10T 428/239; Y10T 428/24008; Y10T 428/24017
See application file for complete search history.

(56) References Cited

U.S. PATENT DOCUMENTS

| | | | | |
|---|---|---|---|---|
| 4,556,082 A | * | 12/1985 | Riley | F16L 59/168 137/375 |
| 4,807,669 A | * | 2/1989 | Prestidge, Sr. | F16L 59/161 137/375 |
| 5,964,252 A | * | 10/1999 | Simmons | F16L 59/022 138/128 |

* cited by examiner

*Primary Examiner* — Michael C Miggins
(74) *Attorney, Agent, or Firm* — Michael S. Young IP Law LLC; Michael S. Young (57) ABSTRACT

A reusable insulation wrap for insulating and protecting an article, the wrap comprising a multilayer insulation member having a nylon protective layer adapted to be abrasion and moisture resistant to prevent damage to the other layers, a polymerized chloroprene stretchable layer adapted to resist moisture and having first and second edges and sized to closely encircle the article, a closed cell foam insulative layer, a foil reflective layer affixed to the closed cell foam adapted outside thereof, a flame retardant and an ultraviolet protectant in one of the layers and a hook and loop fastener adapted to cooperatively engage and maintain desired position on the article, whereby, the wrap is stretched around the article to fit snugly in place minimizing influence of the outside environment including temperature fluctuations, moisture, and debris on the article.

46 Claims, 4 Drawing Sheets

(51) Int. Cl.
  *F16L 59/08*   (2006.01)
  *F16L 57/06*   (2006.01)
  *F16L 59/14*   (2006.01)
  *F16L 59/16*   (2006.01)
  *B32B 5/24*    (2006.01)
  *B32B 25/10*   (2006.01)
  *B32B 25/18*   (2006.01)
  *B32B 27/06*   (2006.01)
  *B32B 27/12*   (2006.01)

(52) U.S. Cl.
  CPC ... *B32B 2262/062* (2013.01); *B32B 2262/101* (2013.01); *B32B 2266/06* (2013.01); *B32B 2266/08* (2013.01); *B32B 2307/304* (2013.01); *B32B 2307/416* (2013.01); *B32B 2307/51* (2013.01); *B32B 2597/00* (2013.01); *Y10T 428/1334* (2015.01); *Y10T 428/23* (2015.01); *Y10T 428/239* (2015.01); *Y10T 428/24008* (2015.01); *Y10T 428/24017* (2015.01)

REMOVABLE AND REUSABLE INSULATION WRAP FOR PIPE, HOSES, AND FIXTURES

CROSS-REFERENCE TO RELATED APPLICATIONS

None.

FIELD OF THE INVENTION

The invention relates to a removable and reusable apparatus for insulating and protecting pipes, hoses, and fixtures from the environment, more specifically the invention is directly related to protecting pipes, hoses, and fixtures from unwanted thermal exchange with the environment including preventing liquids from freezing and potentially damaging the pipes, hoses, and fixtures. More particularly, the invention relates to an apparatus that may comprise an integrated insulation system combining multiple layers of protection and insulation and commercially available fasteners, allowing a user to securely wrap pipes, hoses, and fixtures to protect the pipes, hoses, and fixtures from freezing in cold weather and prevent moisture from reaching the pipes, hoses, and fixtures.

SUMMARY OF THE INVENTION

The invention relates to a apparatus for insulating pipes, hoses, and their associated fixtures that carry fluids in residential, commercial, and industrial areas, thereby protecting them from unwanted thermal transfer including freezing and rupturing during cold weather and preventing other types of damage such as corrosion caused by the exposure to water. More particularly, the invention relates to a removable and reusable apparatus having an integrated insulation system and fasteners, where the integrated insulation system may have multiple layers including but not limited to at least an abrasion resistant layer, a protective layer, a reflective layer, and insulative layer wherein this apparatus is placed around the pipe and hosing and their fixtures and may be held in position using fasteners such as a hook and loop fastener, thereby facilitating the removable and reuse of the apparatus during the inspection and repairs while protecting the pipes, hoses, and fixtures from the extremes of the environment.

One specific use of the invention relates to insulating pipes, hoses, and fixtures in the oil and gas industry. One issue with hydrocarbon recovery is preventing pipes carrying fluids from freezing and rupturing because the fluids contained within the pipes can be a mixture of fresh water, salt water, oil, natural gas liquids (NGLs) and other chemical used for hydrocarbon production. This issue has plagued the oil and gas industry for many years. Two issues arise as liquids approach their freezing point. First, as the temperature approaches the freezing point, liquids increase in viscosity thus slowing the overall movement of the liquid, increasing transportation expense. Second, some liquids expand upon freezing, which may cause problems ranging from simply compromising the integrity of the pipe, hoses, and fixtures, which may have future consequences, to rupturing the pipes, hoses, and fixtures thus shutting down the well site and causing a loss of production. This loss of production affects the well site owner monetarily. It is well known in the industry that insulating the pipes and fixtures may minimize and prevent these problems. However, the use of tape and insulation to protect the pipes, hoses, and fixtures, which are neither elegant nor effective solutions have created another set of problems.

Conventional taping methods to insulate pipe produce mediocre results at best, but taping can also trap and hold moisture between the insulation and the pipes, hoses, and fixtures creating an ideal environment for corrosion to occur. Additionally, repairing pipes, hoses, and fixtures can be time consuming and costly. The technician must remove all the associated insulation and tape for the affected area, which typically destroys the insulation or reduces its effectiveness making it unusable in the future, clean the affected area, replace the appropriate pipe or fixture and install new insulation and tape. Once again, the pipes, hoses, and fixtures are not fully protected after the repair from the environment because this method does not prevent moisture or temperature intrusion because of the irregular shapes of many of the fixtures and using tape as sealing device. Several patents have attempted to address these issues.

It is well known in the industry there are generally two types of insulting systems; first, rigid to semi-rigid type; and second, a flexible type, which is more form fitting. U.S. Pat. No. 3,724,491 to Knudsen teaches a rigid shell with two mating sections, each section constructed with inner and outer metallic sheeting walls having an insulation material therebetween, where the sections are connected using screws, thus providing some protection from the environment. However, this invention does not prevent moisture from entering through the seams or screw attachment points thus minimizing or eliminating corrosion nor is it flexible enough to be applied to hoses.

U.S. Pat. No. 4,022,248 to Hepner teaches two semi-cylindrical pieces of pipe insulation secured to a longitudinally flexible outer cover comprised of aluminum foil-backed fiberglass laminate that acts as a hinge and has an overlapping longitudinal flap with adhesive to prevent separation once the two halves surrounding the pipe have been brought together. However, this invention does not address reusability after the initial installation because the insulation may be destroyed while separating the adhesive strip and the adhesive may lose its effectiveness overtime and after multiple reinstallations due to its exposure to the environment. Additionally, this invention is only flexible around the hinge point thus only can be used on rigid pipe installations.

U.S. Pat. No. 4,807,669 to Prestige Sr. teaches a removable reusable hinged insulating unit with a flexible hollow body and insulating walls wherein the unit has a parting line along its length allowing the unit to be separated at the top in order to envelop the pipe or fixture. Once the unit is placed around the pipe or fixture, the top of the unit is brought together and closed using hook and loop fasteners. In order to create this seal, the invention requires accurate measurements of the pipe or fixture wherein each insulator is specific to a pipe or fixture. Furthermore, due to the rigidity required for the air tight seal, the invention is only flexible around the hinge point during installation thus it can only be used on rigid pipe installations.

U.S. Pat. No. 5,797,415 to Nicholson teaches multi-piece rigid plastic removable and reusable insulation jacket for insulation of pipe or fixtures. Nicholson further teaches the use of the air space between the fixture and the insulation jacket creating substantially all of the insulation value of the insulation system. However, this invention uses ambient air as an insulator wherein as the air temperature drops below freezing and stays there for a significant amount of time, the ambient air temperature will fall below freezing causing the pipes to freeze, and accessing the pipes or fixtures during low temperatures by removing their covers will expedite this process.

U.S. Pat. No. 5,941,287 to Terito, Jr., teaches a removable reusable insulating unit that is a semi-rigid hollow body capable of being easily cut. Terito further teaches an insulating unit capable of insulating a variety of pipe sizes and fixtures by cutting the insulation to match the component to be insulated. However, this invention only addressed the reusability of the insulation on the same component it did not address the portability of the insulating unit to a similar type unit which may have some physical differences that may reduce the overall effectiveness of the insulation.

U.S. Pat. Pub. No. 2013/0106094 to Purdon teaches a shell type fitting cover made from a polymer or flexible thermoplastic material and gasket for preventing water intrusion. However, this invention is limited to angled pipe joints and uses the cover to protect the existing insulation. It does not address the complete access required to repair the pipe and fixtures since the insulation is not integrated into the system.

The rigid to semi-rigid type inventions have some common shortcomings such as the prevention of moisture getting to the pipes, hoses, or fixtures, preventing the outside environment from intruding, and limited to fixed rigid plumbing installations. To address these problems, the other inventions described above chose to tailor each insulation unit to a specific pipe or fixture where it added additional costs due to additional assets required and limited flexibility. Therefore, described below is the current inventions attempt to overcome these above described limitations by using flexible form fitting types of pipe and fixture insulation.

U.S. Pat. No. 4,556,082 to Riley teaches a removable flexible thermal insulating jacket that conforms generally to the shape of the valves and fittings and is secured in place using drawstrings. Even though the drawstrings are tightly drawn this does not prevent moisture from entering where they are used thus enhancing the corrosion possibility. Additionally, the use of drawstrings in harsh environments such as ice and freezing temperatures may cause the strings to deteriorate relatively quickly or completely fail during removal and reuse thus requiring constant replacement and a significant supply of material.

U.S. Pat. No. 5,713,394 to Nygaard teaches a reusable single layer fiberglass mat insulation jacket to wrap the valve and fittings and prevent individuals from be harmed by extremely hot or cold temperatures of the valve and fittings. However, this invention does not create an effective seal to prevent moisture intrusion nor is it flexible enough to be applied to hoses. Additionally, the invention is susceptible to degradation because of ultraviolet (UV) rays exposure.

U.S. Pat. No. 6,016,846 to Knittel teaches a flexible preformed pipe insulation sleeve having a longitudinal slit, allowing it to be placed over the pipe and the slit is closed using an adhesive. When two sections come together on a long pipe, a method to join the ends must be used and the common approach is to use tape spiraling from one section across the joint and down the next section with a sufficient amount coverage to attach both sections together making a single longitudinal piece of insulation that may prevent moisture intrusion. However, this invention does not address reusability after the initial installation because the insulation may be destroyed while separating the adhesive and the joints. Additionally, the adhesive and tape may lose their effectiveness overtime and after multiple reinstallations due to their exposure to the environment, specifically the UV environment.

U.S. Pat. No. 6,907,907 to Maida teaches a removable and reusable flexible pipe valve insulation cover designed to cover and maintain the position of a separate removable insulation covering the pipe and fixtures. However, it only maintains position and does not prevent water intrusion and does protect from UV rays.

The present invention overcomes these shortcomings in the prior art by providing a simple apparatus for insulating pipes, hoses, and fixtures. The simple apparatus is water resistant through the flexibility and stretchability of the apparatus such that the apparatus fits snugly around the pipes, hoses, and fixtures thereby preventing water intrusion and minimizing corrosion. Additionally, the apparatus is flame resistant due flame retardant chemicals added to the neoprene, UV resistant due to UV protection chemicals added to the neoprene. Furthermore, the apparatus provides sufficient flexibility to protect non-rigid piping and hoses such as hydraulic hoses while maintaining the moisture and insulation protection. The present invention fulfills a need for a removable and reusable insulation apparatus protecting pipes, hoses, and fixtures from unwanted thermal transfer including freezing temperatures and harsh weather conditions.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE INVENTION

Figure 1:
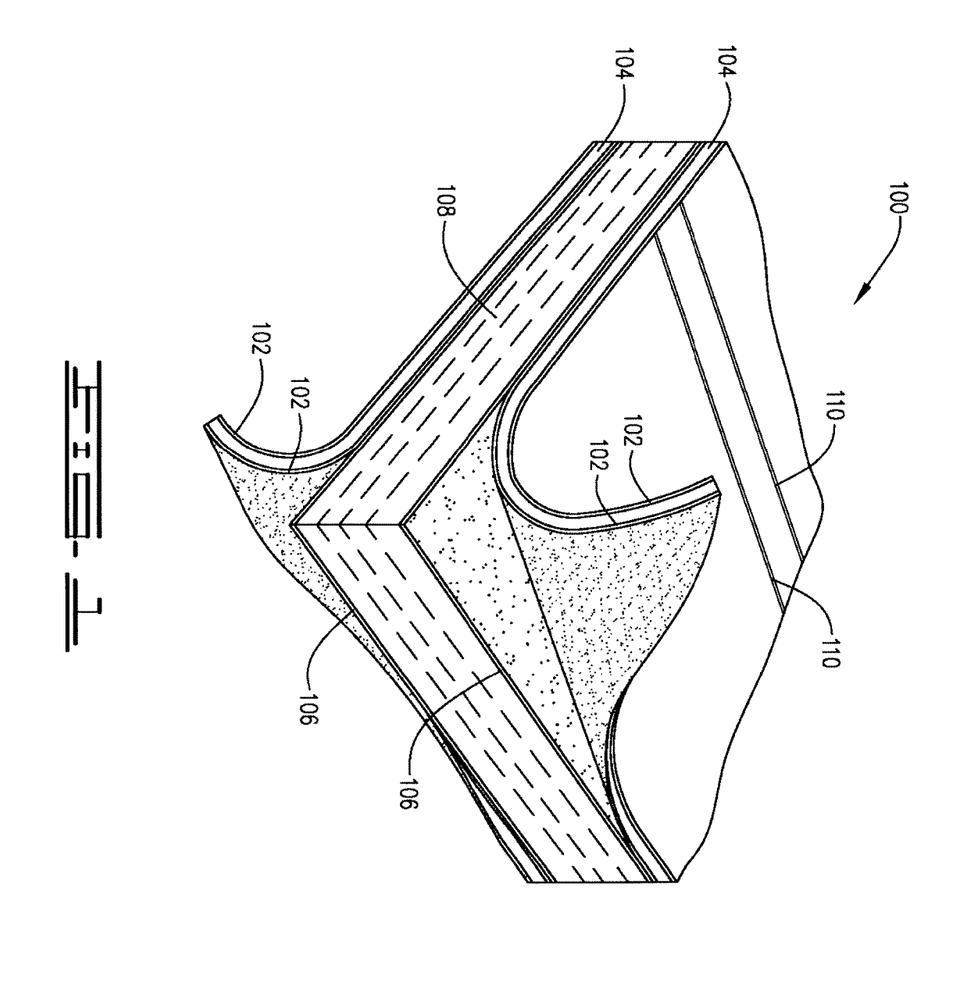
FIG. 1 is a perspective view of a reusable insulation wrap according to the present invention.

FIG. 1 is a perspective view of a reusable multi-layer insulation wrap 100 highlighting the following layers: a pair of protective layers 102 disposed on both sides of a pair of stretchable layers 104, and therebetween an insulative layer 108. In this embodiment, protective layers 102 are permanently affixed to both sides of the stretchable layer 104. As can be seen in the figure, there are two sets of the stretchable layers 104 and protective layers 102 on opposing sides sandwiching the insulative layer 108 therein. The insulative layer 108 is surrounded on all sides by the protective layers 102 and stretchable layers 104. The insulative layer 108 is free-floating inside the pocket created therein by the protective layers 102 and the stretchable layers 104 and is maintained in it a desired position as described below in FIG. 4. The floating insulative layer accommodates overall stretching of the wrap but the relative inelasticity of the insulative layer.

The protective layer 102 is selected from materials that are abrasion and moisture resistant to prevent damage to the other layers. In a preferred embodiment, the protective layers 102 may consist of an inner and outer layer wherein nylon may be permanently affixed to both sides of the stretchable layer 104. Additionally, the inner or outer layers 102 may use different materials depending on the operating environment. For example, nylon may be used for the inner layer and a coated fiberglass fabric, such as a high elastic silica coated fiberglass fabric, may be used for the outer layer allowing one skilled in the art to tailor the protective layer characteristics to the operating environment and provide differing levels of protection based on costs and desired characteristics including but not limited to ultra-violet protection, flame retardant, abrasion resistance, and thermal transfer prevention. Other materials known to one skilled in the art can be used to perform this function such as protective fabrics or abrasion-resistant fabrics. Additionally, the environment where the insulation wrap is to be used and the type of insulative layer may determine the number and type of protective layers needed. The preferred material for the stretchable layer 104 is chloroprene, though one skilled in the art may select other materials such as natural rubber or another polymer based material including isobutylene and isoprene. One skilled in the art may select an insulative layer 108 from elastomeric foam, closed-cell foam, an open-cell foam, wool, cellulose, fiberglass, bubble wrap, and polyurethane. In a preferred embodiment, an insulative layer 108 uses an open-cell for this specific application and more specifically, the open-cell foam is selected from a family of aerogels.

Aerogel is a ultralight, low density, and low thermal conductivity material derived from a gel. An aerogel is created by removing the liquid in the gel by processes such as evaporation and supercritical drying. Once the liquid is removed from the gel, the remaining material is the aerogel. Aerogels may be derived from materials including but not limited to silica, carbon, and alumina. The choice of aerogel to be used is based on the properties desired by the user. For industrial applications, aerogels may come in sheets or in the form of a blanket to be cut to size. For example, Aspen Aerogels produces a family of aerogels, which includes Cryogel®, Cryogel Z®, Pyrogel®, and Spaceloft® wherein the type of aerogel selected may be based on the operating environment and desired application of the user. One skilled in the art may select an insulative layer 108 from the family of aerogels to meet their insulative requirements.

Additional layers may be added to the multi-layer insulation member including but not limited to a reflective layer 106 wherein this reflective layer 106 can be a foil, a coated plastic film, and a reflective fabric. The reflective layer 106 may be free floating inside the pocket as is the closed-cell foam 108, the reflective layer 106 may be permanently affixed to the closed-cell foam 108 or the reflective layer maybe affixed to the layers comprising the pocket. In the preferred embodiment, the reflective layer 106 is a foil, which is permanently affixed to the closed-cell foam insulative layer 108. The reflective layer 106 reflects sunlight and other potentially harmful electromagnetic radiation away from the insulative layer 108 in order to prevent its premature degradation. Additionally, the reflective layer 106 prevents the pipes from being heated by sunlight during the summer and also helps retain the heat of the fluid going through the pipes during the winter, thereby helping to prevent the pipes from freezing.

The multi-layer insulation member is preferably affixed at the edges on all the sides, thus encapsulating the internal layers such as the reflective layer 106 and insulative layer 108. The multi-layer insulation member may have incorporated into it the ability to replace the internal layers. Additionally, if the external layers, which include the protective layer 102 and stretchable layer 104, have been damaged, this access allows the internal layers to be removed and reused again with another protective layer 102, and stretchable layer 104. Access to the internal layers can be through one of the sides, edges, or through a specially designed opening that will be described in FIG. 4. With any of these options for replacing the different layers, an accompanied fastener must be attached so to maintain the integrity of the reusable insulation 100, during normal operations.

Additionally, other features may be included in a reusable insulation wrap 100. One of these features is the addition of a flame retardant to one of the layers since one of the likely places that this insulation may be used is with pipes containing flammable hydrocarbons. Operators in the oil field typically wear flame retardant material at the well sites and any material used at the well site should include some type flame retardant in case of an accident involving fire. Another feature is the addition of ultraviolet protection to one of the layers so to minimize the degradation of the insulation wrap 100 due to the constant exposure to sunshine. Additionally, adding a reflective material 110 to the external side of the insulation wrap 100 to highlight the protected pipes is desirable because many operations at a well site occur during the night and it is likely that operators may inadvertently trip and injure themselves without some type of indication where the pipes are located.

The insulation wrap 100 may be placed on a fixed pipe, stretched sufficiently to provide a snug fit around the pipe and prevent or minimize any outside environmental influences such as temperature fluctuations, moisture, and debris. To one skilled in the art, it would be straightforward to use the insulation wrap on fixed pipes, pipe fixtures, and other equipment related to the field. One other application of the reusable insulation wrap is not only for rigid and semi-rigid piping and its associated fixtures but also on flexible tubes and hoses. The stretchable layer, 104, allows sufficient flexibility to cover a hose such that when the hose is moved and contorted, the wrap stays in place providing constant protection as is done on rigid pipes. An example of this application would be to apply the insulation wrap 100 to hydraulic hoses on vehicles operating in colder climates and at higher elevations.

Figure 2:
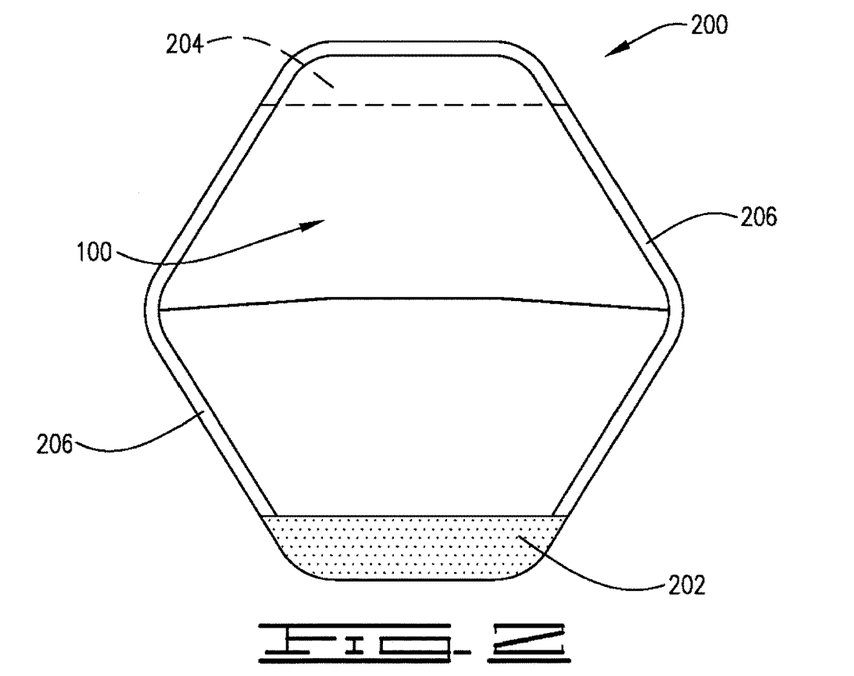
FIG. 2 is an uninstalled view of a wrap for an elbow pipe fitting.

FIG. 2 is the view of a 90-degree elbow wrap 200, before its installation on an elbow pipe fitting. In a preferred embodiment, the elbow wrap 200, uses hook 204 and loop 202 fasteners as the releasable fasteners attached at the edges. One skilled in the art may use different types of releasable fasteners such as zippers, snaps, hook and loop fasteners, magnets, curtain fasteners, hook and eye fasteners, buckles, and buttons and hereinafter incorporated by reference. The hook 204 and loop 202 portions are brought together to fasten the wrap around the elbow 300 snugly in order to hold it in place and maintain its desired position. Preferably edging 206 is affixed to all the external edges in order to prevent the protective layer 102, and the stretchable layer 104 from being damaged.

Figure 3:
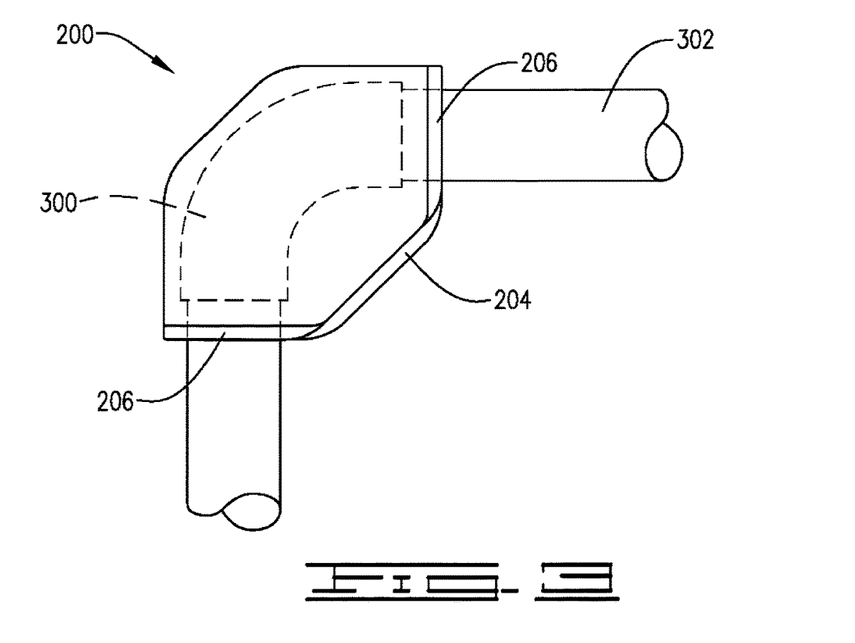
FIG. 3 is an installed view with a wrap on an elbow.

FIG. 3 shows the elbow wrap 200 installed on an elbow fitting 300 with pipes 302 connecting to the 90-degree elbow fitting 300. The hook 204 and loop 202 portions are brought together while stretching the wrap snugly around the elbow fitting to prevent intrusion of debris, moisture, and to minimize the effects of temperature fluctuations. Protecting an elbow fitting 300 from physical damage is one application of the insulation wrap.

Figure 4:
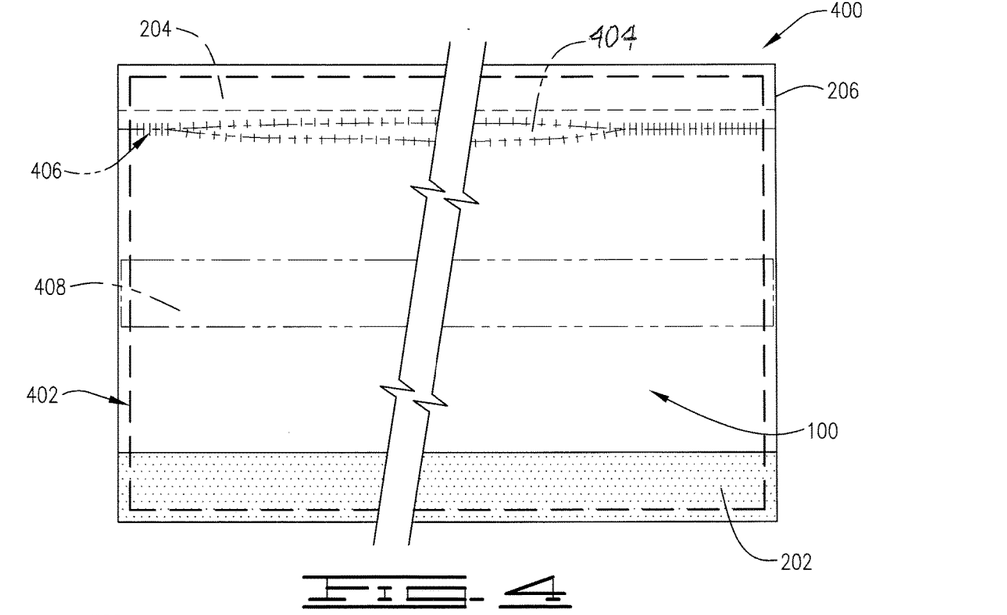
FIG. 4 is a top view of a wrap for a straight pipe.

FIG. 4 is a top view of the insulation wrap for a straight pipe. This wrap can be made in various lengths and circumferences depending on the pipe and the user's requirements. The straight pipe wrap 400 is preferably rectangular. As described earlier the insulation layer 108 may be positioned between two protective layers 102 and stretchable layers 104. The insulation layer 108 may be maintained in the desired position using stitching 402, which is designed to limit the movement of the reflective layer 106 and the insulative layer 108, which are expected, but not required, to be relatively inelastic compared to the elastic and protective layers. One skilled in the art may use other methods to maintain the internal layers in the desired position such as at least one fastener penetrating more than one of the layers to retain the insulative 108 and reflective 106 layers in relative position vis-à-vis the relatively more elastic layers.

As described earlier regarding FIG. 1, FIG. 4 may have a pocket opening 404 enabling the removal and replacement of the insulative layer 108 and/or the reflective layer 106. The pocket opening 404 has a pocket fastener 406 that allows a user to seal the opening after the insulative layer 108 or reflective layer 106 have been reinstalled. In this embodiment, the preferred releasable fastener for the pocket opening 404 is hook 204 and loop 202 portions but one skilled in the art may use other releasable fasteners such as zippers, snaps, magnets, curtain fasteners, hook and eye fasteners, buckles, and buttons. Additionally, a straight pipe wrap 400 may include a heating element positioner 408. This positioner 408 is designed to maintain a heating element in a desired location near or against a pipe, for example to prevent the pipe from freezing or a liquid from becoming more viscous than desired as a result of heat loss. The type of heating element that may be used will depend on the area of the country, the availability of resources such as liquids and gases. Another consideration for a user is the cost for the particular type of heating element selected. The heating element may come from either electric, liquid or a gas wherein the liquid and gas are heated and may be circulated through a closed system following the same path of the pipe to be protected. Based on the heating element selected, a heating element positioner 408 may be attached to the straight pipe wrap 400. The positioner 408 can be a sewn-in pocket wherein the tubing or the electric heating element may be slid through and maintained in a desired location by the positioner 408. Other methods for maintaining the heating element in a desired location may include other releasable fasteners known to one skilled in the art and are herein incorporated by reference. The straight insulation wrap 400 may include any of the described features in the preceding figures.

Figure 5:
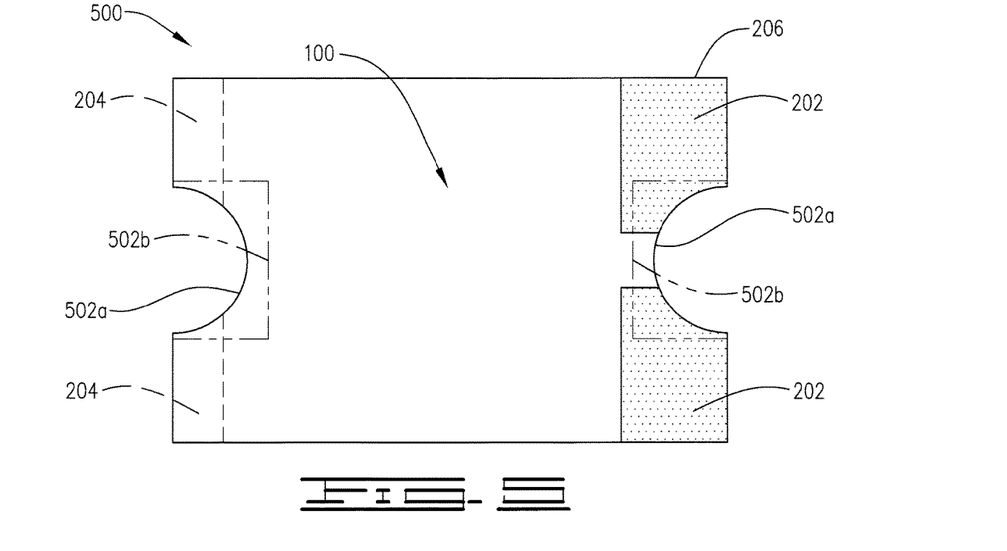
FIG. 5 is a top view a wrap with a cutout for a water meter.

FIG. 5 is a top view of a wrap with a cutout, for example for use with a water meter. The cutout wrap 500 is similar to the straight pipe insulation wrap 400 as described above in FIG. 4. At least one difference between FIG. 4 and FIG. 5 is that FIG. 5 has a cutout 502 to accommodate a water meter protruding through the insulation wrap 100. This cutout 502 may be circular 502a, rectangular 502b, or a variation thereof based on the type equipment that is to be wrapped and the penetration therein. This cut-out wrap 500 may be used on other types of equipment including but not limited to water meters that need access for viewing or actuation by the user. For instance, a valve may protrude through the hole created by the cutout 502 in order for a user on the well site to be able to actuate the valve. This cutout 502 may provide quick user access without having to remove the wrap. The size of the cutout 502 and the length and width of the cutout wrap 500 is dependent upon the type of fitting or equipment that it will be surrounding.

Figure 6A:
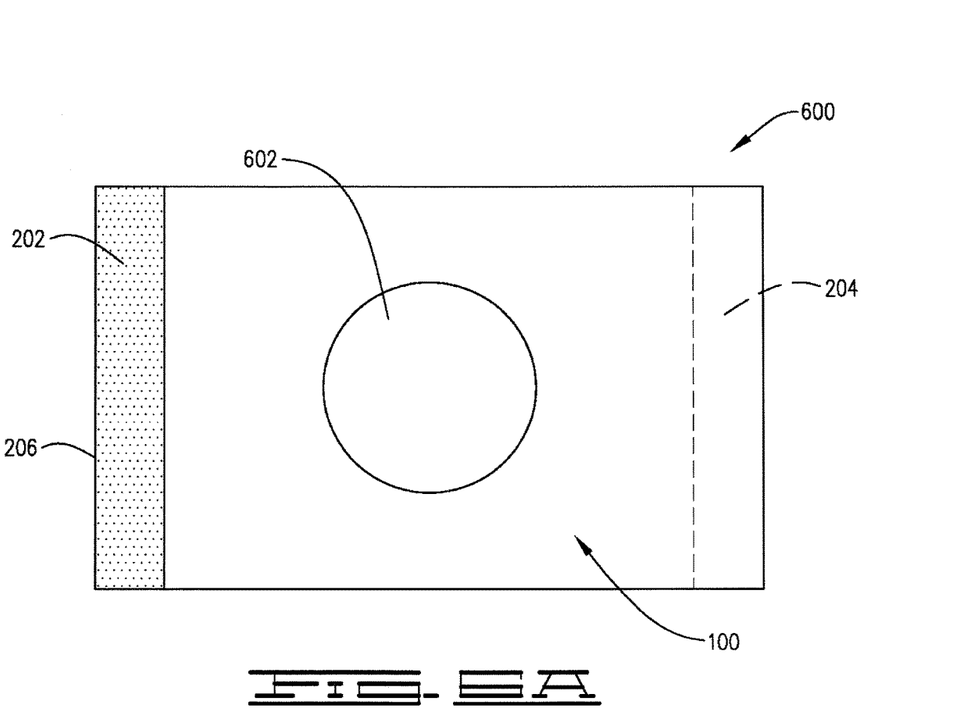
FIG. 6A is a top view of a wrap with a protection housing for a check valve.
Figure 6B:
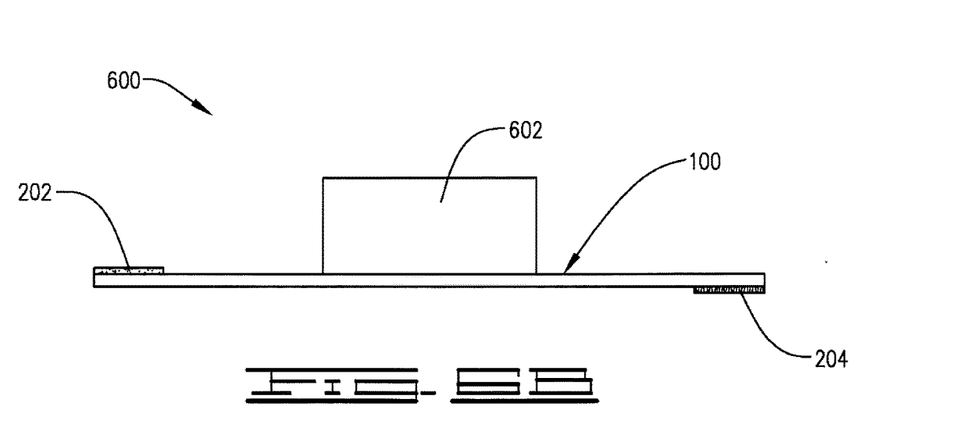
FIG. 6B is a side view of the wrap with a protection housing for a check valve.

FIGS. 6A and 6B are views of a wrap with a housing 602 adapted to protect a particular type of equipment, for example a check valve. FIG. 6A is a top view, and FIG. 6B is a side view. The protective wrap 600 is similar to the wrap in FIG. 4 with one exception being the housing 602. That housing covers a particular type of equipment (e.g., a check valve) to protect it from the environment and is shown in a center area of the wrap rather than on its periphery. This protective wrap 600 prevents the equipment from becoming damaged due to the environment, which in turn prevents a possible safety problem cause by the environment. The same features as described above are available to the check valve wrap 600. FIG. 6B is a side view of the wrap with a housing 602. The housing 602 is sized with respect to the physical size and configuration of the equipment to be protected.

The reusable insulation wrap disclosed includes multiple configurations adapted to engage a variety of piping elements including, but not limited to, the 90 degree elbow wrap 200, the straight pipe wrap 400, the cutout wrap 500, and the check valve wrap 600. There are different types of equipment, pipes, hoses, and fixtures for which the reusable insulation wrap may be applied. The wrap may be used on rigid and semi-rigid pipes, hoses, and fixtures and on flexible hoses and tubing.

The various embodiments disclosed and claimed enable a user to wrap a variety of articles including, but is not limited to, a pipe, a tube, or a hose, for the purposes of insulating and protecting the article from temperature fluctuations, moisture, and debris. Additionally, when a user needs access to the underlying article, the wrap is not damaged by removal thus needing to be discarded and replaced with new insulation. These embodiments enable a user to quickly remove and reinstall the wrap while insulating and preventing damage to an underlying article.

The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

While the invention has been shown, illustrated, described, and disclosed in terms of specific embodiments or modifications, the scope of the invention should not be deemed to be limited by the precise embodiments or modifications therein shown, illustrated, described, or disclosed. Such other embodiments or modifications are intended to be reserved especially as they fall within the scope of the claims herein appended.

Having thus described the invention, we claim:

1. A reusable insulation wrap comprising:
   a multilayer insulation member having
      at least one stretchable layer adapted to resist moisture and having first and second edges and sized to closely encircle an article,
      at least one insulative layer adapted to accommodate deformation of the at least one stretchable layer, and
      at least one protective layer adapted to be abrasion and moisture resistant and prevent damage to at least one of the at least one stretchable layer and the at least one insulative layer, where the at least one protective layer is one of a pair of protective layers wherein each one of the pair of protective layers uses different materials than the other one of the pair of protective layers; and
   a releasable fastener configured to close the multilayer insulation member in releasable engagement with the article; whereby, the wrap is configured to stretch around the article to fit snugly in place to minimize influence of an outside environment including temperature fluctuations, moisture, and debris on the article.

2. The reusable insulation wrap of claim 1 where the at least one protective layer is selected from aramids, para-aramids, aliphatic polyamides, fiberglass, and cellulose fibers.

3. The reusable insulation wrap of claim 1 where the at least one stretchable layer is selected from at least one of natural rubber and a polymer based on chloroprene, isobutylene, or isoprene.

4. The reusable insulation wrap of claim 1 where the at least one insulative layer is selected from at least one of elastomeric foam, closed cell foam, open-cell foam, wool, cellulose, fiberglass, bubble wrap, and polyurethane.

5. The reusable insulation wrap of claim 1 wherein the reusable insulation wrap is flexible and the at least one protective layer is more elastic than the at least one insulative layer.

6. The reusable insulation wrap of claim 1 where the reusable insulation wrap is one of a plurality of reusable insulation wraps, further comprising a detachable cover adapted to enclose more than one adjoining reusable insulation wrap.

7. The reusable insulation wrap of claim 1 wherein the releasable fastener is configured to open the multilayer insulation member to provide a user with access to the article without damage to the at least one stretchable layer, the atleast one insulative layer, and the at least one protective layer, whereas the releasable fastener is configured to close the multilayer insulation member to restrict the user from access to the article.

8. The reusable insulation wrap of claim 1 wherein the article is characterized as a first article, and the releasable fastener is configured to open the multilayer insulation member from fitting snugly around the first article without damage to the at least one stretchable layer, the at least one insulative layer, and the at least one protective layer, such that the multilayer insulation member is undamaged and configured to fit snugly around a second article.

9. The reusable insulation wrap of claim 1 wherein the at least one insulative layer is relatively inelastic in comparison to the at least one protective layer and the at least one stretchable layer.

10. The reusable insulation wrap of claim 1 where the at least one protective layer and the at least one stretchable layer are affixed at each edge and on all sides encapsulate the at least one insulative layer, whereby the at least one insulative layer is retained in a desired position while accommodating deformation of the at least one stretchable layer.

11. The reusable insulation wrap of claim 10 further comprising at least one reflective layer encapsulated with the at least one insulative layer.

12. The reusable insulation wrap of claim 11 where the at least one reflective layer is selected from at least one of foil, coated plastic film, and reflective fabric.

13. The reusable insulation wrap of claim 1 where the releasable fastener is selected from at least one of zippers, snaps, hook and loop fasteners, magnets, curtain fasteners, hook and eye fasteners, buckles, and buttons.

14. The reusable insulation wrap of claim 13 where the releasable fastener has variable attachment points, whereby variations in size of the article and elasticity of the reusable insulation wrap are accommodated.

15. The reusable insulation wrap of claim 1 further comprising a heating element positioner adapted to maintain a heating element in a desired location near the article.

16. The reusable insulation wrap of claim 15 further comprising a positioning element adapted to maintain the heating element in the desired position, the positioning element selected from at least one of pockets, loops, zippers, snaps, hook and loop fasteners, magnets, curtain fasteners, hook and eyes, buckles, and buttons.

17. A reusable insulation wrap comprising:
   a multilayer insulation member having
      at least one polymerized chloroprene stretchable layer adapted to resist moisture having first and second edges and sized to closely encircle an article,
      at least one closed cell foam insulative layer,
      at least one foil reflective layer affixed to the closed cell foam insulative layer,
      at least one nylon protective layer adapted to be abrasion and moisture resistant to prevent damage to at least one of the at least one polymerized chloroprene stretchable layer, the at least one closed cell foam insulative layer, and the at least one foil reflective layer,
      a flame retardant in at least one of the at least one nylon protective layer, the at least one polymerized chloroprene stretchable layer, the at least one closed cell foam insulative layer, and the at least one foil reflective layer, and
      ultraviolet protectant in at least one of the at least one nylon protective layer, the at least one polymerized chloroprene stretchable layer, the at least one closed cell foam insulative layer, and the at least one foil reflective layer; and a hook and loop fastener adapted to cooperatively engage and maintain the reusable insulation wrap in a desired position on the article; whereby, the reusable insulation wrap is stretched around the article to fit snugly in place minimizing influence of an outside environment including temperature fluctuations, moisture, and debris on the article.

18. The reusable insulation wrap of claim 17 wherein the hook and loop fastener is adapted to open to provide a user with access to the article without damage to the multilayer insulation member.

19. An apparatus comprising:
a first outer protective layer configured to be abrasion and moisture resistant;
an outer stretchable layer contactingly adjacent the first outer protective layer, the outer stretchable layer configured to resist moisture and the outer stretchable layer having a first outer edge and a second outer edge that are sized to closely encircle an article;
a second outer protective layer contactingly adjacent the outer stretchable layer, the second outer protective layer and the first outer protective layer are permanently affixed on opposing sides of the outer stretchable layer to form an outer protective layer;
an insulative layer contactingly adjacent the second outer protective layer, the insulative layer configured to accommodate deformation of the outer stretchable layer;
a first inner protective layer contactingly adjacent the insulative layer, the first inner protective layer configured to be abrasion and moisture resistant;
an inner stretchable layer contactingly adjacent the first inner protective layer, the inner stretchable layer configured to resist moisture and the inner stretchable layer having a first inner edge and a second inner second edge that are sized to closely encircle the article, wherein the insulative layer is configured to accommodate deformation of the inner stretchable layer;
a second inner protective layer contactingly adjacent the inner stretchable layer, the second inner protective layer and the first inner protective layer are permanently affixed on opposing sides of the inner stretchable layer to form an inner protective layer, wherein the outer protective layer and the inner protective layer surround the insulative layer on all sides, and the second inner protective layer is configured to fit snugly contactingly adjacent the article;
a first releasable fastener on a first connection edge of the outer protective layer; and
a second releasable fastener on a second connection edge of the inner protective layer, where in a closed position the first releasable fastener and the second releasable fastener are configured to close the inner protective layer and the outer protective layer to insulate and protect the article from temperature fluctuations, moisture, and debris, which restricts access of a user to the article, and in an open position the first releasable fastener and the second releasable fastener are configured to open the inner protective layer and the outer protective layer, which grants the user access to the article without damage to the inner protective layer, the outer protective layer, and the insulative layer.

20. The reusable insulation wrap of claim 19 wherein the insulative layer is configured to be free-floating inside a pocket formed by the outer protective layer and the inner protective layer.

21. A reusable insulation wrap comprising:
a multilayer insulation member having
at least one stretchable layer adapted to resist moisture and having first and second edges and sized to closely encircle an article,
at least one insulative layer adapted to accommodate deformation of the at least one stretchable layer, and
at least one protective layer adapted to be abrasion and moisture resistant and prevent damage to at least one of the at least one stretchable layer and the at least one insulative layer, where the at least one protective layer is selected from aramids, para-aramids, aliphatic polyamides, fiberglass, and cellulose fibers; and
a releasable fastener configured to close the multilayer insulation member in releasable engagement with the article; whereby, the wrap is configured to stretch around the article to fit snugly in place to minimize influence of an outside environment including temperature fluctuations, moisture, and debris on the article.

22. The reusable insulation wrap of claim 21 where the at least one protective layer is one of a pair of protective layers wherein each one of the pair of protective layers uses different materials than the other one of the pair of protective layers.

23. The reusable insulation wrap of claim 21 where the at least one stretchable layer is selected from at least one of natural rubber and a polymer based on chloroprene, isobutylene, or isoprene.

24. The reusable insulation wrap of claim 21 where the at least one insulative layer is selected from at least one of elastomeric foam, closed cell foam, open-cell foam, wool, cellulose, fiberglass, bubble wrap, and polyurethane.

25. The reusable insulation wrap of claim 21 wherein the reusable insulation wrap is flexible and the at least one protective layer is more elastic than the at least one insulative layer.

26. The reusable insulation wrap of claim 21 where the reusable insulation wrap is one of a plurality of reusable insulation wraps, further comprising a detachable cover adapted to enclose more than one adjoining reusable insulation wrap.

27. The reusable insulation wrap of claim 21 where the at least one protective layer and the at least one stretchable layer are affixed at each edge and on all sides encapsulate the at least one insulative layer, whereby the at least one insulative layer is retained in a desired position while accommodating deformation of the at least one stretchable layer.

28. The reusable insulation wrap of claim 27 further comprising at least one reflective layer encapsulated with the at least one insulative layer.

29. The reusable insulation wrap of claim 28 where the at least one reflective layer is selected from at least one of foil, coated plastic film, and reflective fabric.

30. The reusable insulation wrap of claim 21 where the releasable fastener is selected from at least one of zippers, snaps, hook and loop fasteners, magnets, curtain fasteners, hook and eye fasteners, buckles, and buttons.

31. The reusable insulation wrap of claim 30 where the releasable fastener has variable attachment points, whereby variations in size of the article and elasticity of the reusable insulation wrap are accommodated.

32. The reusable insulation wrap of claim 21 further comprising a heating element positioner adapted to maintain a heating element in a desired location near the article.

33. The reusable insulation wrap of claim 32 further comprising a positioning element adapted to maintain the heating element in the desired position, the positioning element selected from at least one of pockets, loops, zippers, snaps, hook and loop fasteners, magnets, curtain fasteners, hook and eyes, buckles, and buttons.

34. A reusable insulation wrap comprising:
a multilayer insulation member having
at least one stretchable layer adapted to resist moisture and having first and second edges and sized to closely encircle an article, where the at least one stretchable layer is selected from at least one of natural rubber and a polymer based on chloroprene, isobutylene, or isoprene,
at least one insulative layer adapted to accommodate deformation of the at least one stretchable layer, and
at least one protective layer adapted to be abrasion and moisture resistant and prevent damage to at least one of the at least one stretchable layer and the at least one insulative layer; and
a releasable fastener configured to close the multilayer insulation member in releasable engagement with the article; whereby, the wrap is configured to stretch around the article to fit snugly in place to minimize influence of an outside environment including temperature fluctuations, moisture, and debris on the article.

35. The reusable insulation wrap of claim 34 where the at least one protective layer is one of a pair of protective layers wherein each one of the pair of protective layers uses different materials than the other one of the pair of protective layers.

36. The reusable insulation wrap of claim 34 where the at least one protective layer is selected from aramids, para-aramids, aliphatic polyamides, fiberglass, and cellulose fibers.

37. The reusable insulation wrap of claim 34 where the at least one insulative layer is selected from at least one of elastomeric foam, closed cell foam, open-cell foam, wool, cellulose, fiberglass, bubble wrap, and polyurethane.

38. The reusable insulation wrap of claim 34 wherein the reusable insulation wrap is flexible and the at least one protective layer is more elastic than the at least one insulative layer.

39. The reusable insulation wrap of claim 34 where the reusable insulation wrap is one of a plurality of reusable insulation wraps, further comprising a detachable cover adapted to enclose more than one adjoining reusable insulation wrap.

40. The reusable insulation wrap of claim 34 where the at least one protective layer and the at least one stretchable layer are affixed at each edge and on all sides encapsulate the at least one insulative layer, whereby the at least one insulative layer is retained in a desired position while accommodating deformation of the at least one stretchable layer.

41. The reusable insulation wrap of claim 40 further comprising at least one reflective layer encapsulated with the at least one insulative layer.

42. The reusable insulation wrap of claim 41 where the at least one reflective layer is selected from at least one of foil, coated plastic film, and reflective fabric.

43. The reusable insulation wrap of claim 34 where the releasable fastener is selected from at least one of zippers, snaps, hook and loop fasteners, magnets, curtain fasteners, hook and eye fasteners, buckles, and buttons.

44. The reusable insulation wrap of claim 43 where the releasable fastener has variable attachment points, whereby variations in size of the article and elasticity of the reusable insulation wrap are accommodated.

45. The reusable insulation wrap of claim 34 further comprising a heating element positioner adapted to maintain a heating element in a desired location near the article.

46. The reusable insulation wrap of claim 45 further comprising a positioning element adapted to maintain the heating element in the desired position, the positioning element selected from at least one of pockets, loops, zippers, snaps, hook and loop fasteners, magnets, curtain fasteners, hook and eyes, buckles, and buttons.

* * * * *